United States Patent [19]
Hodgetts

[11] Patent Number: 5,976,672
[45] Date of Patent: Nov. 2, 1999

[54] CARGO LINER AND CARGO HOLDER SYSTEM

[75] Inventor: Graham L. Hodgetts, Baden, Pa.

[73] Assignee: Loadhandler Industries, Inc., Austin, Tex.

[21] Appl. No.: 08/742,630

[22] Filed: Nov. 1, 1996

[51] Int. Cl.⁶ ................................................. B32B 23/02
[52] U.S. Cl. .............................. 428/192; 428/33; 428/53; 428/58; 428/116; 428/178; 428/180; 428/212
[58] Field of Search .................................... 428/167, 178, 428/137, 33, 53, 58, 99, 101, 120, 116, 180, 212, 156, 172, 192; 5/417

[56] References Cited

U.S. PATENT DOCUMENTS

| | | | |
|---|---|---|---|
| 3,086,899 | 4/1963 | Smith et al. | 428/178 |
| 3,899,805 | 8/1975 | McMillin | 428/33 |
| 4,287,693 | 9/1981 | Collette | 52/177 |
| 4,361,614 | 11/1982 | Moffitt | 428/138 |
| 4,468,910 | 9/1984 | Morrison | 428/60 |

*Primary Examiner*—Donald Loney
*Attorney, Agent, or Firm*—Webb Ziesenheim Logsdon Orkin & Hanson, P.C.

[57] ABSTRACT

A cargo liner and cargo holder system includes a mat having a plurality of protrusions extending from a base. Locking members include a plurality of engagement members extending from a body and are adapted to engage with the protrusions of the mat. The mat includes a plurality of geometrically-shaped protrusions which can be octagonally shaped or cylindrically shaped. The locking members can be secured to boxes or other objects for securement to the mat. The mat also includes a lip extending around the perimeter of the mat for containment of any liquids therein. The mat also includes two layers, a polyethylene first layer and an olefin-friendly rubber layer. The locking members can be modified and secured to a bag-hanging device. Movable side members can be secured to the locking members for securement of boxes to the mat. Also disclosed is a method for making the mat.

36 Claims, 20 Drawing Sheets

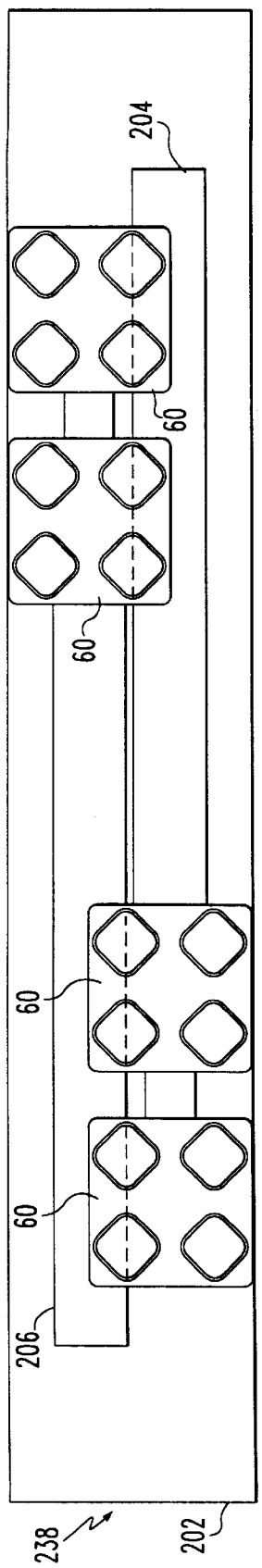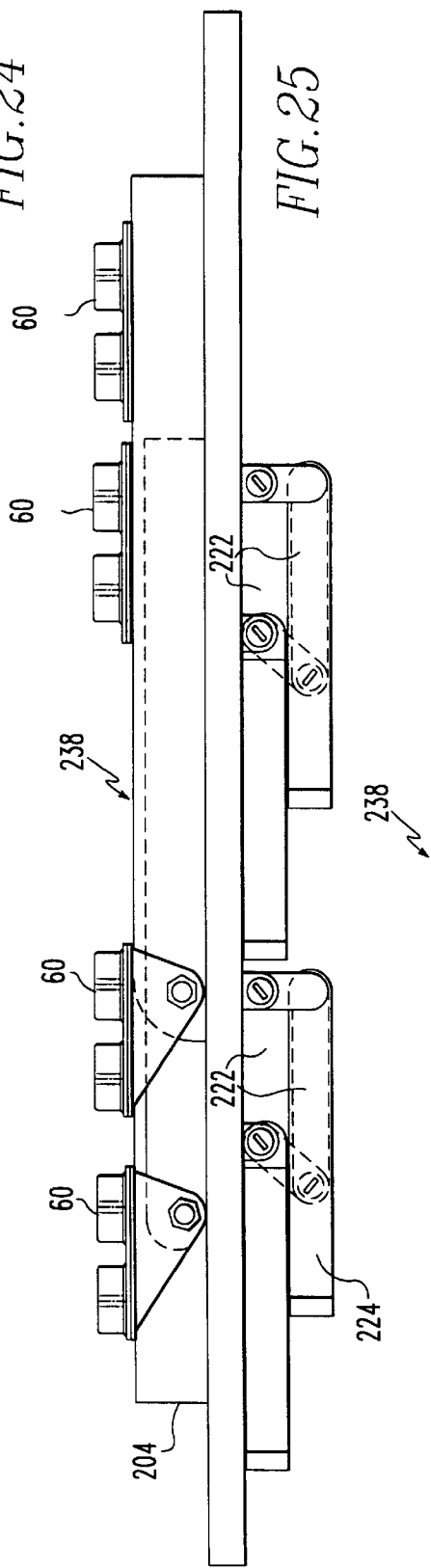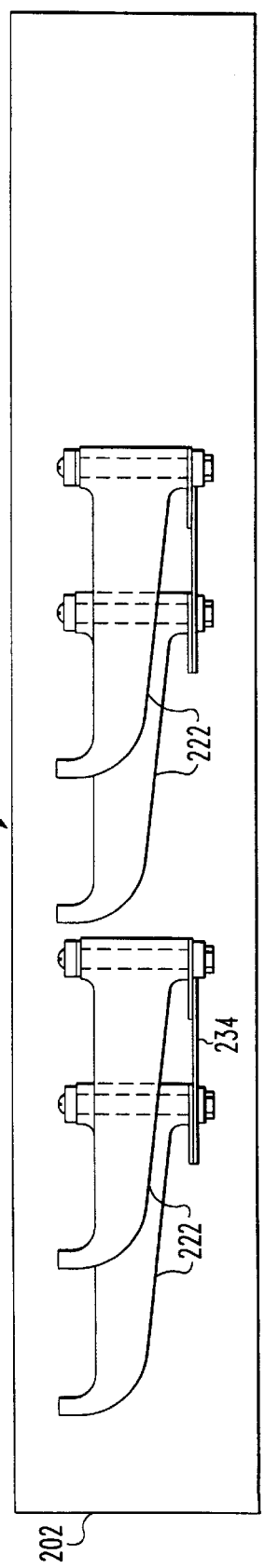

CARGO LINER AND CARGO HOLDER SYSTEM

BACKGROUND OF THE INVENTION

1. Field of the Invention

This invention relates generally to cargo liners and cargo holder systems, and more particularly, to mats or liners used in vehicles.

2. Description of the Prior Art

Sport utility vehicles (SUVs) such as, for example, the Jeep Cherokee®, have recently become very popular. These vehicles provide the ruggedness of a truck and the comfort of an automobile. Typically, a sport utility vehicle includes a front passenger section and a rear cargo storage section which is usually carpeted.

Generally, the rear-carpeted section has plenty of storage room; however, boxes and bags tend to slide about the rear-carpeted section when the vehicle is in motion. The sliding is primarily caused by a low coefficient of friction between a box or bag and the carpeting. This can create a dangerous situation should the driver suddenly stop the vehicle. In the case of grocery bags, the bag contents generally spill by the time the driver arrives at his/her final destination. This can pose a problem if a liquid, such as bleach, spills in the rear section.

Therefore, it is an object of the present invention to provide an arrangement for preventing articles, such as boxes or bags, from freely moving around in a vehicle and especially in the rear section of a sport utility vehicle.

SUMMARY OF THE INVENTION

The present invention is a cargo holder system that includes a mat and a locking member. The mat includes a base and at least one protrusion extending from the base. The locking member includes a body and an engagement member extending therefrom, wherein the protrusion of the mat removably engages the engagement member of the locking member. The protrusions are contained within a plurality of rows and columns and are symmetrical with each other. The protrusions can be any shape which is a geometrical shape, such as a polygon or a circle. The protrusions are spaced apart from each other and define a receiving recess adapted to receive the engagement members. A lip can be provided extending around the perimeter of the base of the mat. Nubs and recesses can be provided on the engagement members and the protrusions for removably securing the locking member to the mat.

The mat can include a first layer and a second layer, wherein the first layer is formed of a low coefficient of friction material and the second layer is formed of a high coefficient of friction material. The first layer can be made of polyethylene and the second layer can be of an olefin-friendly rubber material.

The mat can be made by the following process, including the steps of: vacuum forming the polyethylene first mat portion; forming a second mat portion sheet, including approximately 75% rubber and approximately 25% polyethylene; heating the first mat portion; heating the second mat portion; placing the second mat portion on the first mat portion; and heating and pressing the portions together until the first mat portion thermally bonds to the second mat portion.

The locking member can also include a movable side member attached to the body of the locking member on a side opposite the side in which the engagement member extends. The locking member is L-shaped and rides on a track.

A bag hanger for use with a mat is provided and includes a plurality of legs, cross members secured to the legs, a hanger secured to the cross member, and a plurality of the above-described locking members secured to the legs.

Also provided is a method for removably securing an object to the mat, which includes the steps of: placing an underside of the mat on a supporting surface; securing an engagement member to an object; and positioning the engagement member between the protrusions on the mat, thereby releasably securing the object to the mat.

BRIEF DESCRIPTION OF THE DRAWINGS

FIG. 24 is a top plan view of the hanging device shown in FIG. 21 in a collapsed state;

FIG. 25 is a side elevational view of the hanging device shown in FIG. 24;

FIG. 26 is a bottom plan view of the hanging device shown in FIG. 24;

DESCRIPTION OF THE PREFERRED EMBODIMENTS

Figure 1:
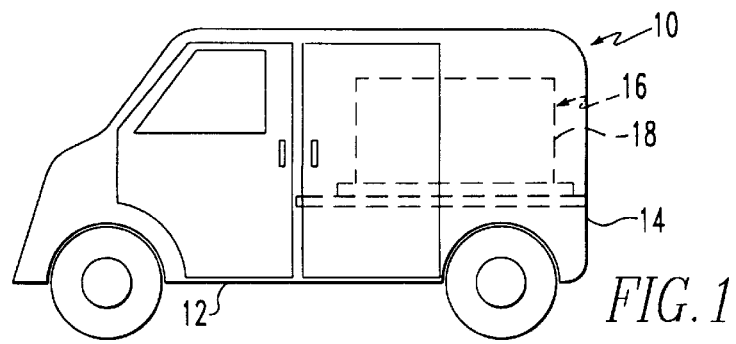
FIG. 1 is a side elevational view of a sport utility vehicle having a cargo liner and cargo holder system in accordance with the present invention.

FIG. 1 shows a sport utility vehicle 10 having a front passenger section 12 and a rear cargo section 14. The rear cargo section 14 contains a cargo holder system 16 in accordance with the present invention removably securing a box 18 thereto.

Figure 2:
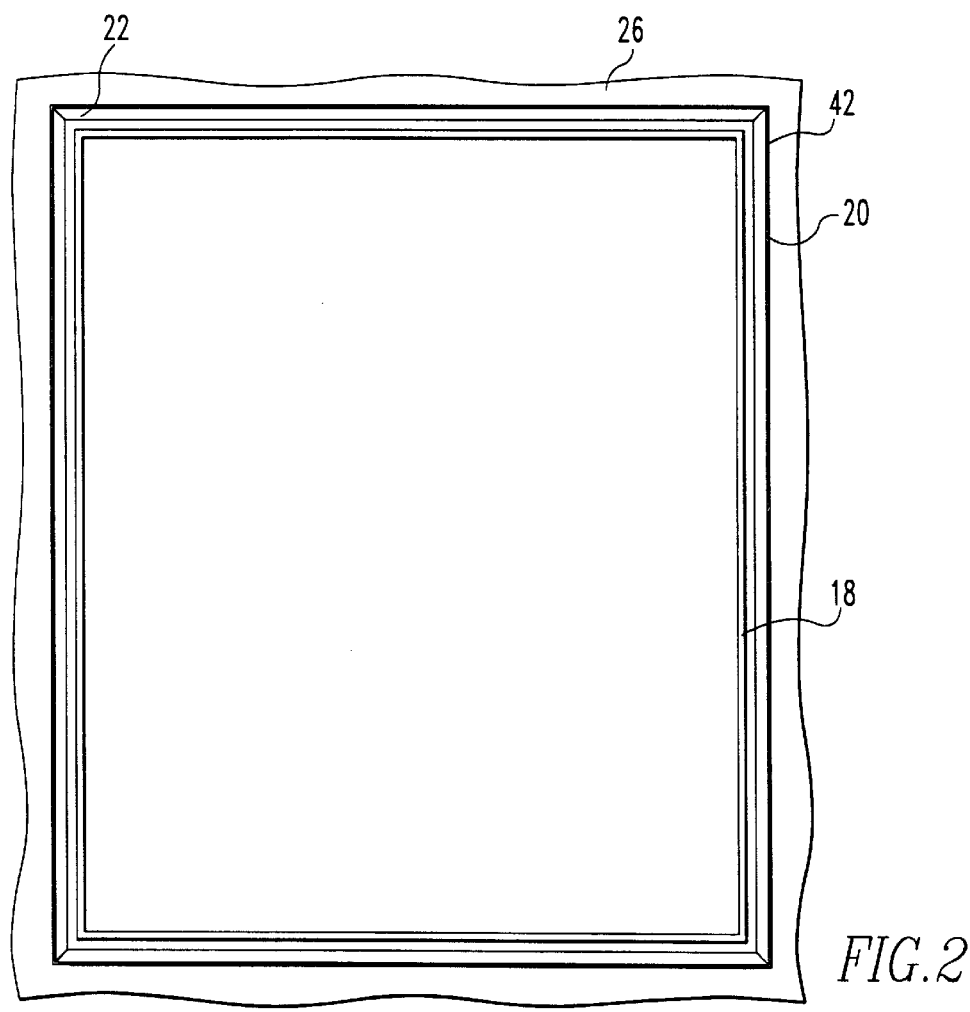
FIG. 2 is a top plan view showing the cargo holder system in accordance with the present invention.
Figure 3:
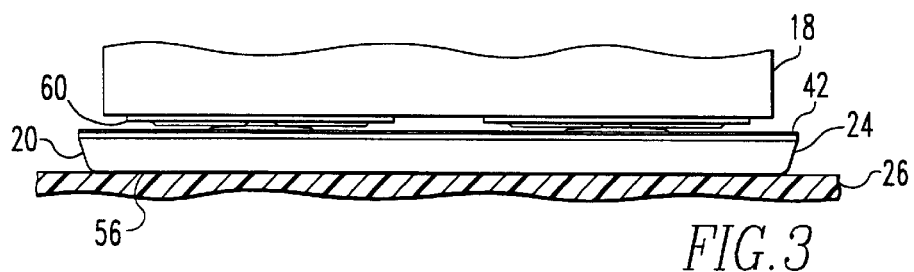
FIG. 3 is a side elevational view, partially in section, of the cargo holder shown in FIG. 2.
Figure 4:
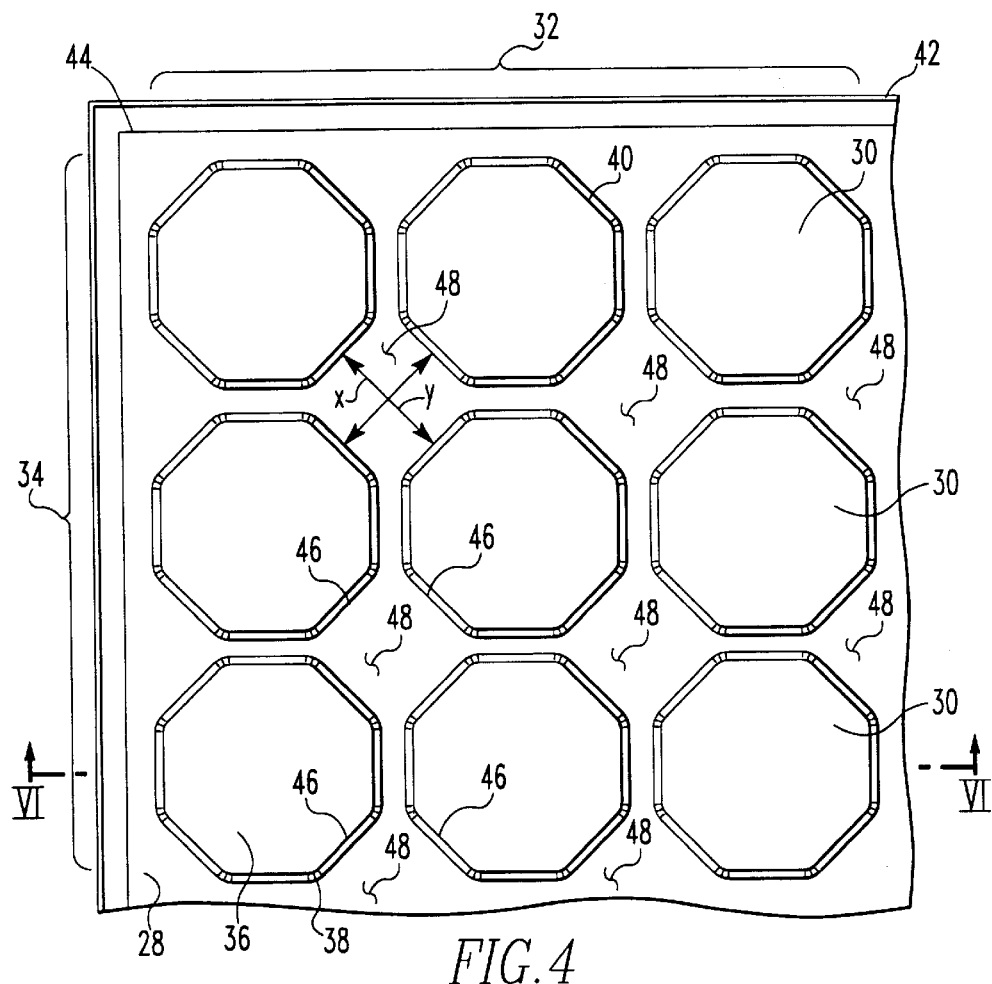
FIG. 4. is a top plan view of a portion of a cargo holder system mat in accordance with the present invention.
Figure 5:
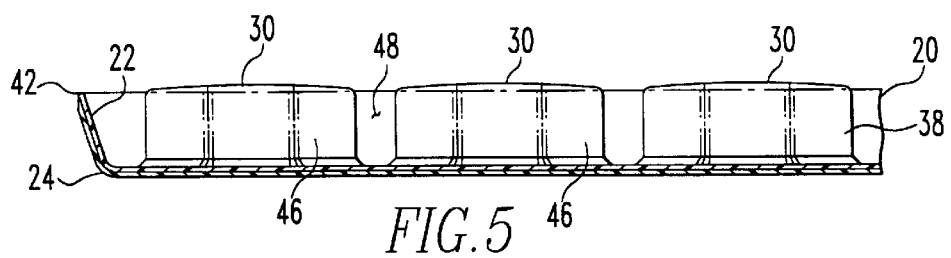
FIG. 5 is a side elevational view, partially in section, of the mat shown in FIG. 4.
Figure 6:
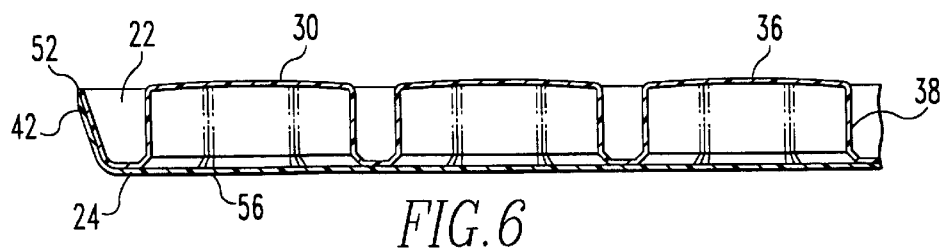
FIG. 6 is a section taken along lines VI—VI shown in FIG. 4.
Figure 7:
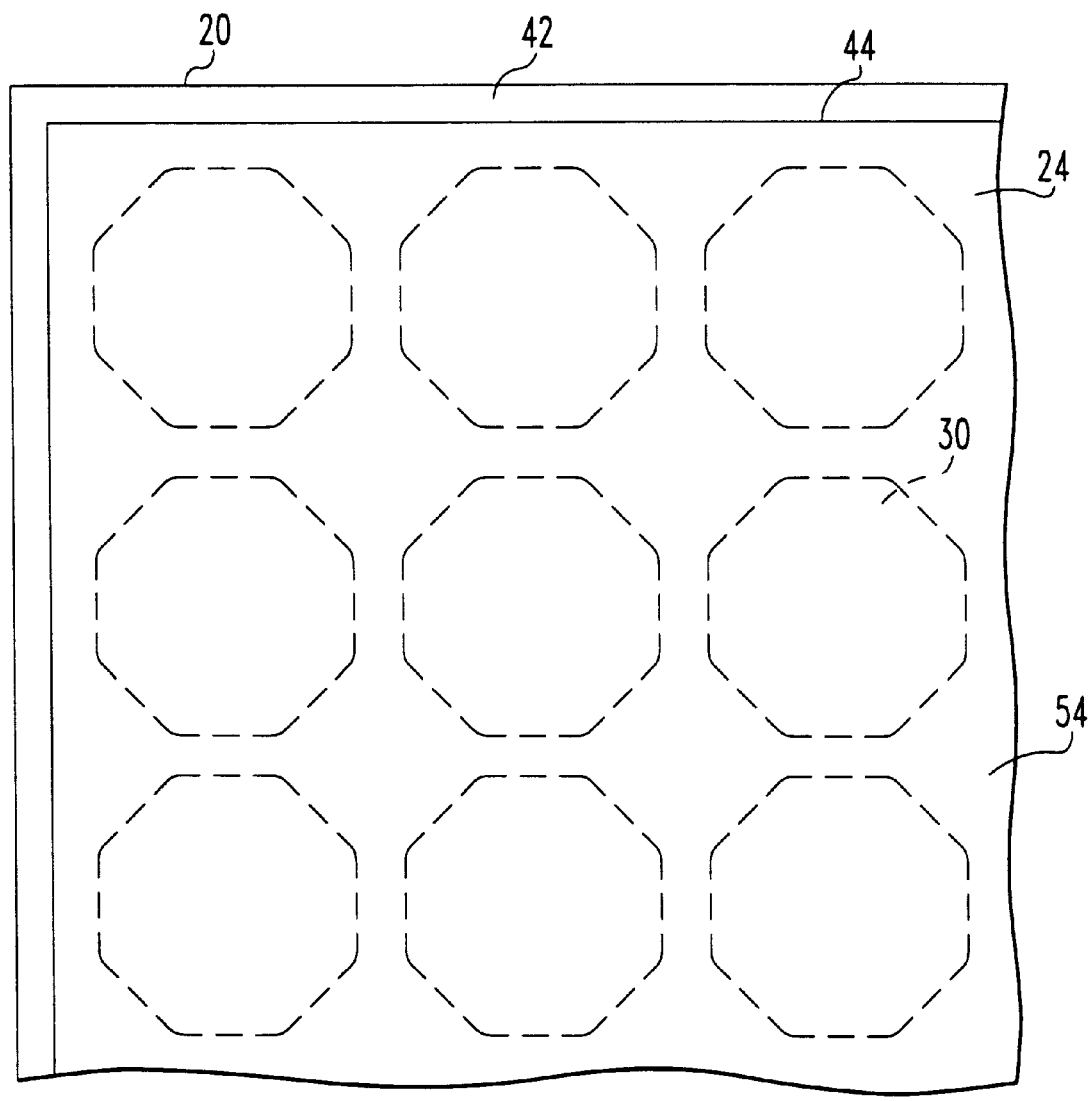
FIG. 7 is a bottom plan view of the portion of the mat shown in FIG. 4.

Referring to FIGS. 2 and 3, the cargo holder system 16 includes a rectangular-shaped mat or liner 20 having a first layer 22 and a second layer 24. The second layer 24 rests on a carpeted or plastic section 26 of the rear cargo section 14 of the sport utility vehicle 10. The box 18 is secured to the first layer 22 of the mat 20. Referring to FIG. 4, the mat 20 includes a flat base 28 having a plurality of symmetrically spaced-apart protrusions 30 extending therefrom. Protrusions 30 are formed in a plurality of columns 32 and rows 34. As shown in FIGS. 5 and 6, each protrusion 30 includes an upper surface 36 connected to a side surface 38. A perimeter 40 of the side surface 38 defines an octagon geometric shape. The perimeter 40 can be any geometric shape, but preferably is polygonally shaped. A lip 42 extends about a perimeter 44 of the base 28. Preferably, at least a portion of the upper surfaces 36 of the protrusions 30 extend beyond an upper edge 52 of the lip 42. Referring again to FIG. 4, respective portions 46 of side surfaces 38 of adjacent protrusions 30 define receiving recesses 48. The receiving recesses 48 each include four portions 46 of side surfaces 38 of adjacent protrusions 30 that define a portion of a rectangular shape which, in the preferred embodiment, is square.

Preferably, the first layer 22 is made of a material having a first or low coefficient of friction, such as polyethylene, and the second layer 24 is made of a material having a second or high coefficient of friction, such as rubber. As is evident, the first coefficient of friction is different than the second coefficient of friction. Preferably, the two layers 22 and 24 are bonded together, although they can be adhered together by an adhesive or mechanically fastened together.

A preferable method for bonding the two sections together is set forth as follows. First, the first layer 22, which includes the protrusions 30, is vacuum formed from recycled polyethylene. Next, a sheet of olefin-friendly rubber is provided. The olefin-friendly rubber is made from approximately 75% crumb rubber (such as provided from recycled automobile tires). Then, the first layer 22 is maintained at approximately the forming temperature or reheated at one side (underside 56) for twenty seconds at 375° F. The olefin-friendly rubber sheet is concurrently heated at one side for forty seconds at 375° F. so that both heating cycles end simultaneously. The heated side of the rubber sheet is placed on an underside 56 of the first layer 22. Mechanical pressure is applied to both layers 22 and 24 together so that the hot side of the olefin-friendly rubber sheet is pressed against the underside 56 of the first layer 22 bonding thereto and forming the second layer 24. This, in turn, forms a unitary mat 20.

Figure 8:
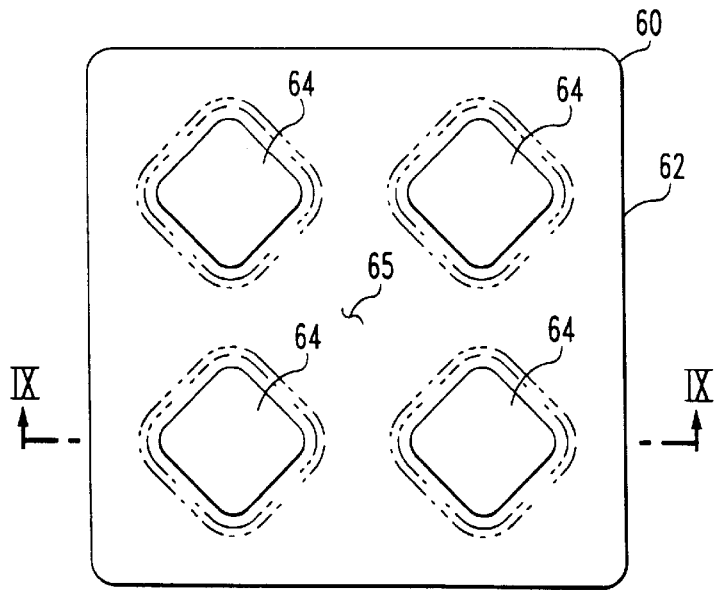
FIG. 8 is a top plan view of a locking member in accordance with the present invention.
Figure 9:
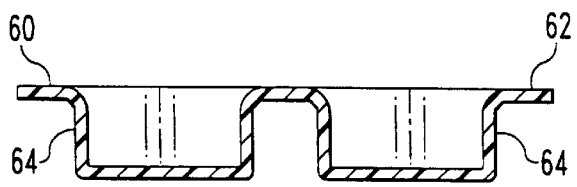
FIG. 9 is a section taken along lines IX—IX shown in FIG. 8.
Figure 10:
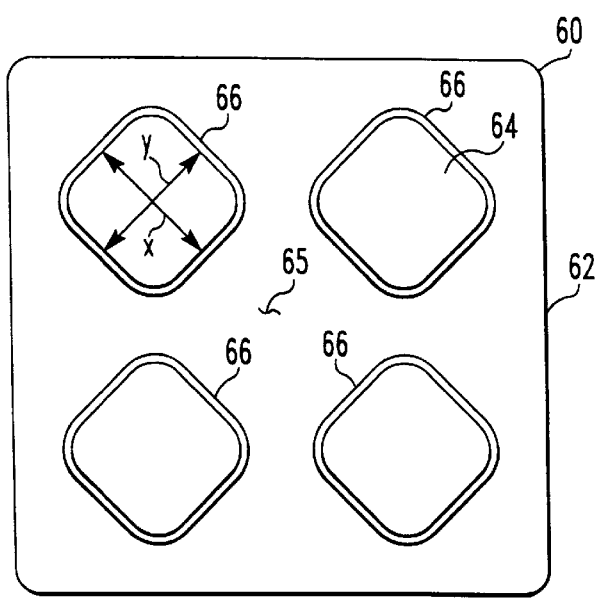
FIG. 10 is a bottom plan view of the locking member shown in FIG. 8.

The receiving recesses 48, as shown in FIG. 4, are adapted to removably receive a plurality of engagement members 64, as shown in FIG. 8. Specifically, FIGS. 3 and 8–10 show a locking member 60, which is positioned at a lower end of the box 18. The engagement members 64 extend from the bottom of the box 18. Referring specifically to FIGS. 8–10, each locking member 60 includes a flat body 62 and a plurality of spaced, substantially square-shaped engagement members 64. A protrusion-receiving recess 65 is defined by adjacent locking members 60. The engagement members 64 are adapted to be removably received by receiving recesses 48. The engagement members 64 can be any shape, such as a geometric shape, a polygonal shape or a rectangular shape. Opposite sides of the engagement members 64 are spaced apart distances X and Y, respectively. Likewise, opposite sides defining the receiving recesses 48 are preferably spaced a distance apart approximately equal to or less than the distances X and Y. The locking member 60 is preferably made from polyethylene; however, it can be made of any other material.

Figure 11:
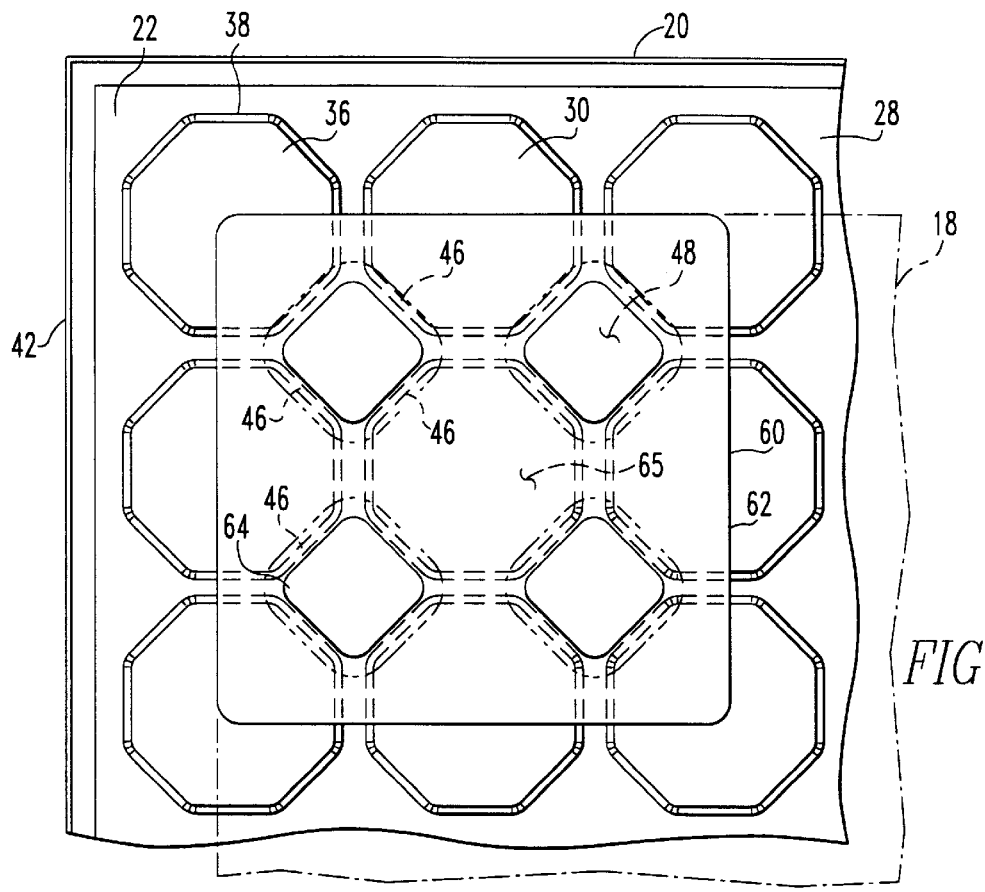
FIG. 11 is a top plan view of the locking member shown in FIG. 8 engaging with the portion of the mat shown in FIG. 4.
Figure 12:
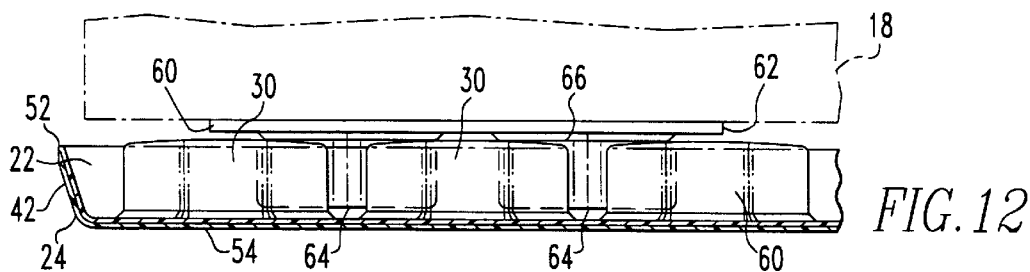
FIG. 12 is a side elevational view of the arrangement shown in FIG. 11.
Figure 13:
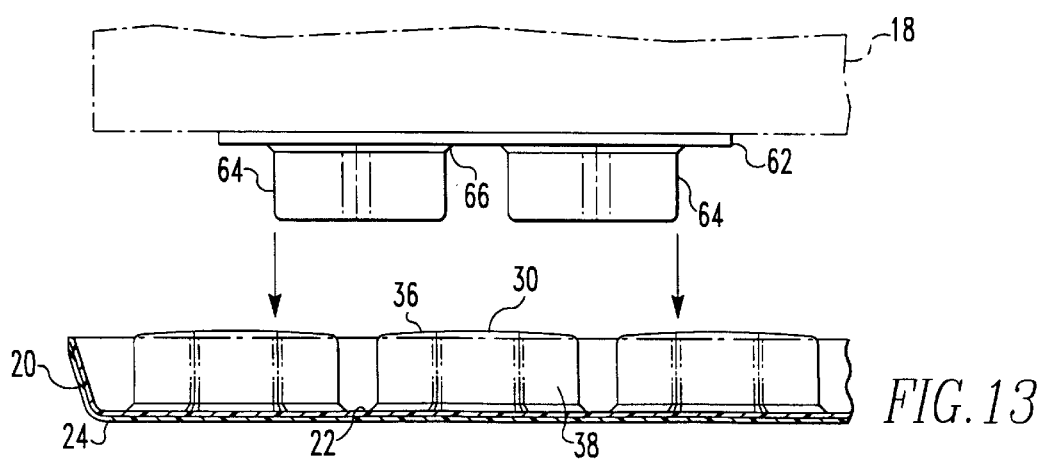
FIG. 13 is a side elevational view of the locking member and the mat shown in FIGS. 11 and 12 prior to engagement.

FIGS. 11–13 show one locking member 60 coacting with the mat 30. The box 18 is shown in phantom. Specifically, respective locking members 60 are placed over or aligned with receiving recesses 48, as shown in FIG. 13. The engagement members 64 are then received within the receiving recesses 48 so that one or more of the protrusions 30 removably engage one or more of the engagement members 64. Preferably, side surfaces of the engagement member 64 abut respective portions 46 of the protrusion side surfaces 38. A step 66 is provided around each of the engagement members 64, which is adapted to abut upper surfaces 36 of protrusions 30 so that the body 62 of the locking member 60 extends away from or is positioned above the upper edge 52 of the mat 20. Should the box 18 or the locking member 60 be removed from the mat 20, then it need only to be lifted away from the mat 20 so that the engagement members 64 are positioned away from or disengaged from the mat 20.

Figure 14A:
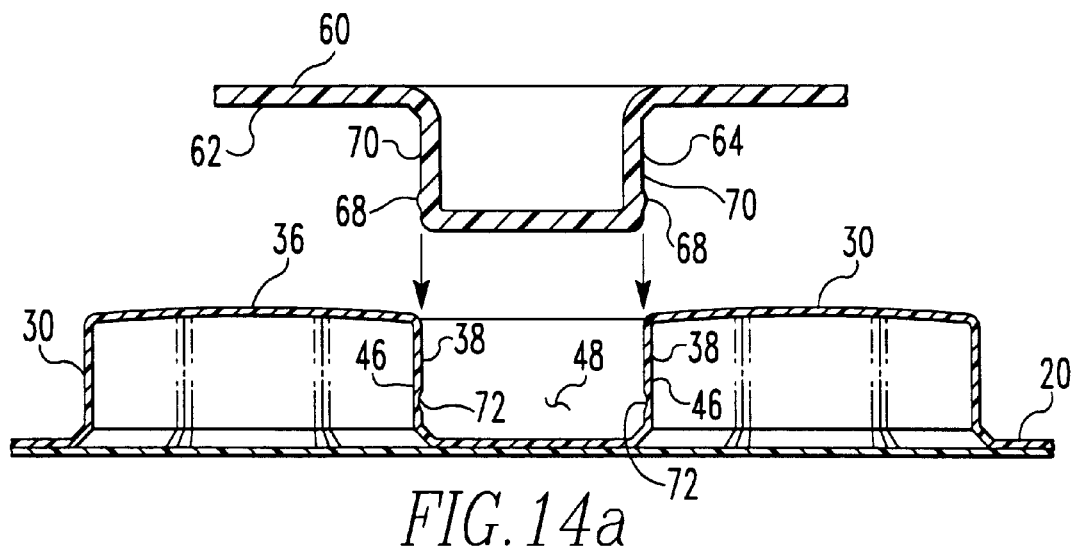
FIG. 14a is an exploded sectional side view of another embodiment of the cargo holder system, which is provided with nubs extending from an engagement member of the locking member and recesses defined within protrusions of the mat, which are adapted to receive the nubs.
Figure 14B:
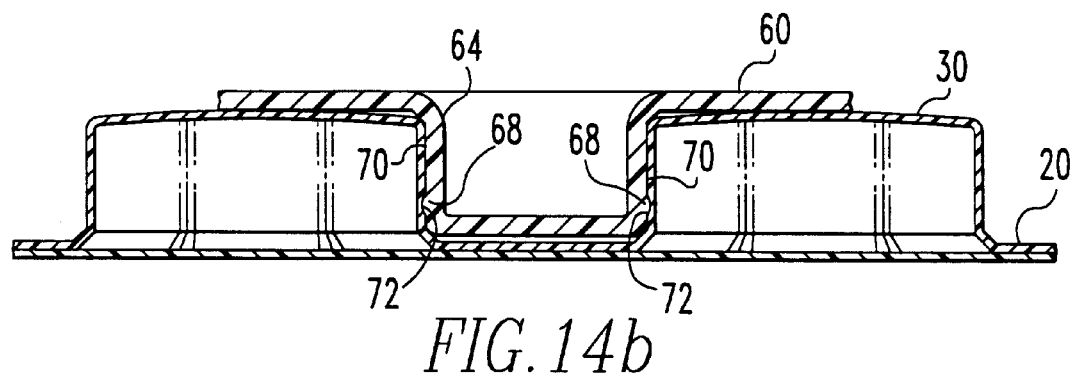
FIG. 14b is a sectional side view of the cargo holder system shown in FIG. 14a in an engaged position.

FIGS. 14a and 14b show another embodiment of the present invention. Specifically, a locking arrangement is provided with the mat 20 and the locking member 60. This embodiment is similar to that previously disclosed, except for the below-noted differences. Like reference numerals will be used for like parts. A nub 68 extends along side surfaces 70 of each engagement member 64. A dimple 72 is defined on each of the portions 46 of the protrusion side surfaces 38. In operation, when the engagement member 64 is received within the receiving recesses 48, nubs 68 are removably received within the respective dimples 72, thereby removably locking or coacting with the locking member 60 to the mat 20. The locking member 60 can be removed from the mat 20 by pulling locking member 60 away from the mat 20. Alternatively, dimples can be defined along side surfaces 38 of each engagement member and nubs can be provided on each portion 46 of the protrusion side surfaces.

Figure 15A:
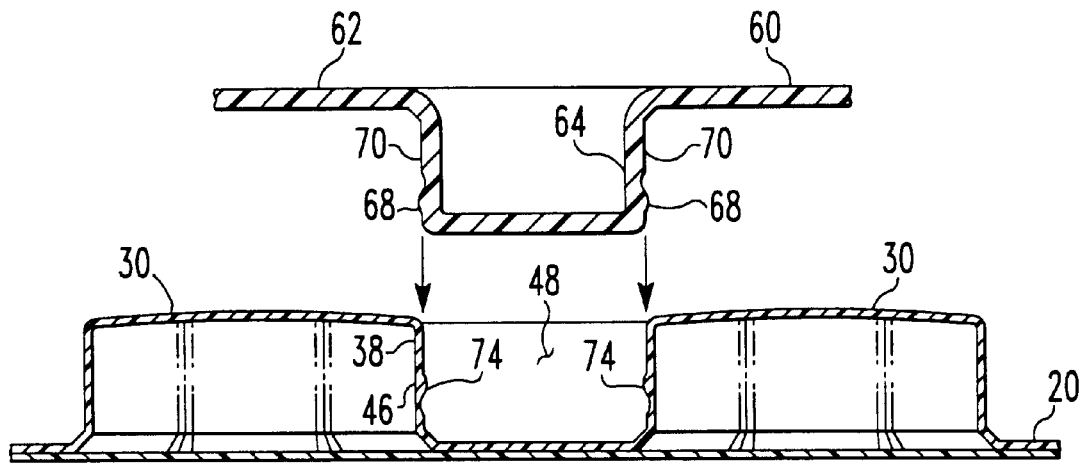
FIG. 15a is an exploded sectional side view of another embodiment of the cargo holder system, which includes nubs extending from the locking member, engagement member, and the mat protrusions.
Figure 15B:
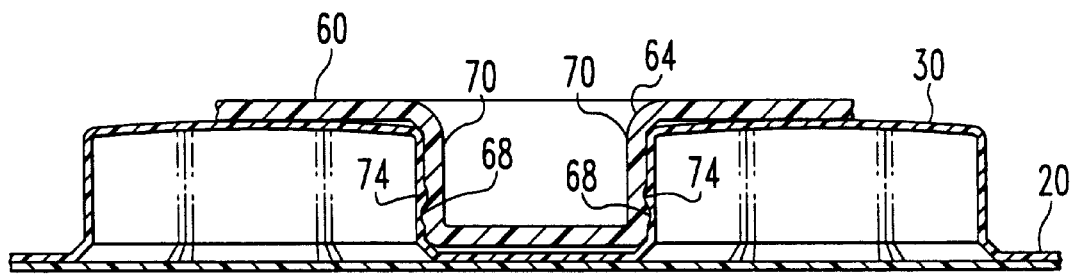
FIG. 15b is a sectional side view of the cargo holder system shown in FIG. 15a in an engaged position.

FIGS. 15a and 15b show another embodiment of the present invention similar to that shown in FIGS. 14a and 14b, except nubs 74 are provided on portion 46 of the protrusion side surfaces 38 and extend into receiving recesses 48.

The cargo holder system 16 operates as follows. An underside 56 of the rubber second layer 24 is placed on and coacts with the carpet section or supporting surface 26 and prevents the mat 20 and the box 18 or other object (which is secured to the mat via the engagement members 64 of the locking members 60 being positioned between the protrusions 30) from sliding on the carpet or floor, especially in the rear section of a sport utility vehicle while the sport utility vehicle 10 is moving. In this arrangement, the box 18 is releasably secured to the mat 20. Further, if a liquid or dry material, such as a powder, spills out of the box 18, it is contained within the mat 20 by the lip 42. In some instances, a low friction mat may be required to move a heavy object out of the sport utility vehicle 10. In that case, the mat 20, absent the box 18 and the locking members 60, can be turned over so that the low friction polyethylene first layer 22 rests on the carpeted section 26. The heavy object can then be placed on the second layer 24 and easily moved across the carpeted section 26.

Figure 16A:
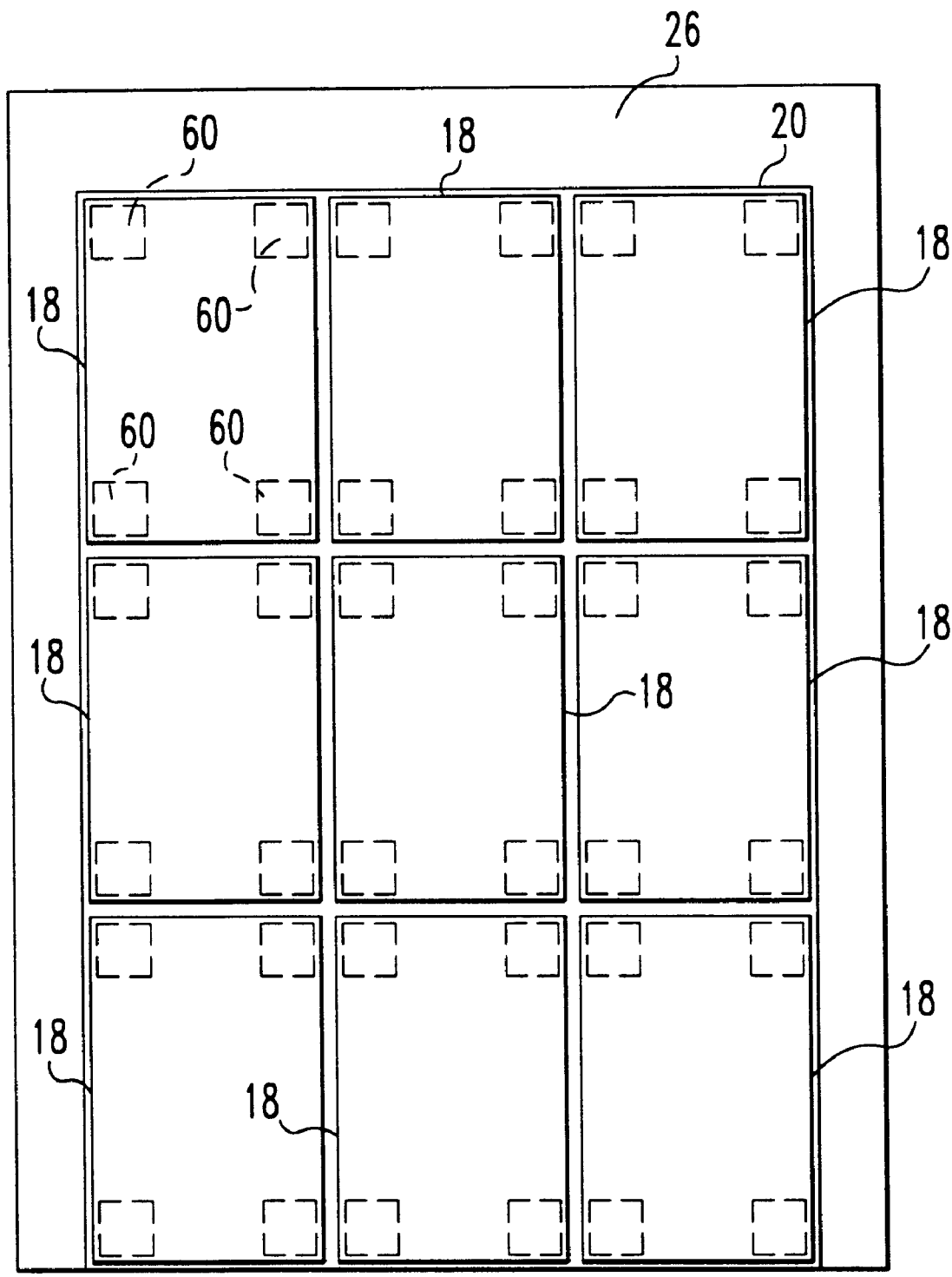
FIG. 16a is a top plan view of an arrangement of boxes positioned on the mat shown in FIGS. 2 and 3.

FIG. 16a shows a plurality of boxes or receptacles 18 secured to the mat 20. The boxes can be preformed having locking members 60 defined on a bottom surface, whereby the locking members 60 form a portion of the boxes 18. The specific orientation of the boxes and the mat are dependent on the vehicle size. One preferable mat has a dimension of twenty-four protrusion columns 32 by eighteen protrusion rows 34.

Figure 16B:
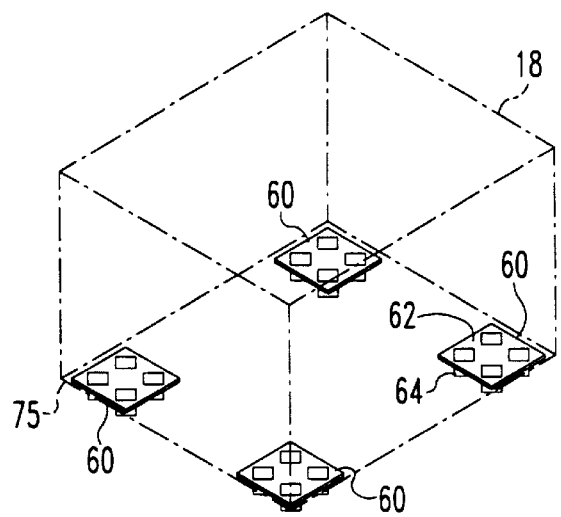
FIG. 16b is a perspective view of a box having a plurality of locking members secured thereto.
Figure 16C:
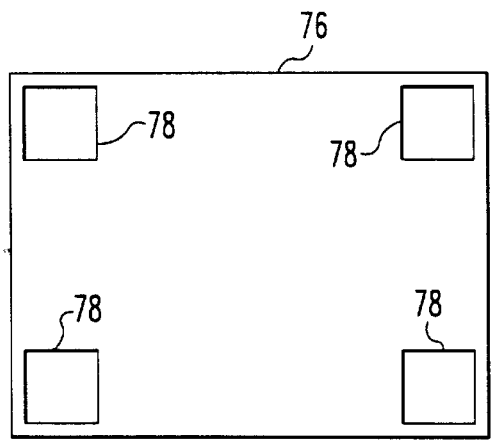
FIG. 16c is a top plan view of a template for use in securing the locking members to the box.
Figure 16D:
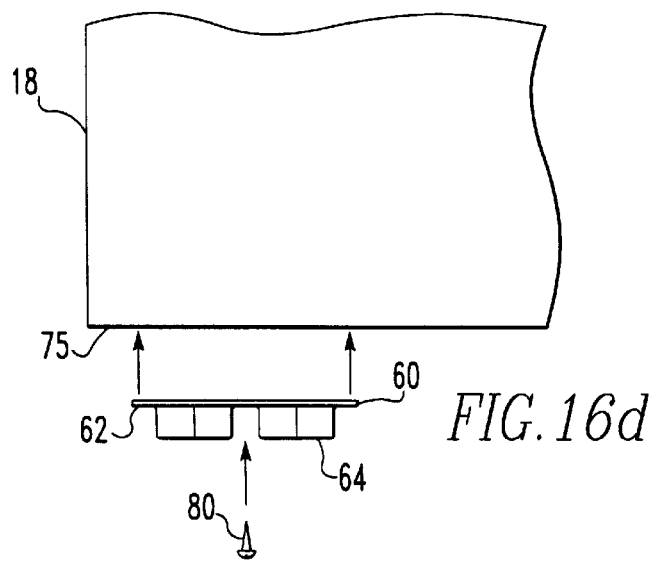
FIG. 16d is a side exploded view of an arrangement to secure the locking members to the box.

Referring to FIG. 16b, box 18 includes four locking members 60 positioned adjacent the four corners of the bottom 75 of box 18. Although it is preferable to have the locking members 60 integrally molded with the box or other object, it is also possible to attach the locking members 60 to the box 18 so that the locking members 60 are not integral with the box 18. Referring to FIG. 16c, a template 76 is provided defining spaced-apart slots 78 for placement of the bodies 62 of the locking members 60. The template 76 is placed over the bottom surface 75 of a box 18 or other object. The four locking member bodies 62 are placed in slots 78. As shown in FIG. 16d, holes are then drilled through each of the bodies 62 and the bottom 75 of the box 18 for receipt of a fastener, such as a screw 80. Each screw then passes through the respective body 62 and is secured to the box 18, thereby securing the locking members 60 to the box 18. The template 76 insures that the engagement members 64 of all of the locking members 60 are properly spaced to be received by receiving recesses 48 defined by respective protrusions 30 of the mat 20. This prevents the possibility of protrusions 30 preventing the engagement members 64 from passing into the receiving recesses 48 due to improper placement of the locking members 60. In lieu of screws 80, nails or adhesives can be used to secure the locking members 60 to the box. The template 76 can be made of paper, plastic or metal. Also, in the alternative, the template can also only identify the placement of holes to be drilled in the box, which would align with holes defined in the locking members 60. In that case, the locking members would be secured to the box by fasteners passing through the holes in both the respective locking members 60 and box 18. The template 76 and the locking members 60 can be provided as a kit along with the fasteners 80 or adhesive. Alternatively, clips (not shown) can be provided on the locking members 60 so that the locking members 60 can be removably secured to the boxes 18 or other objects.

Figure 17:
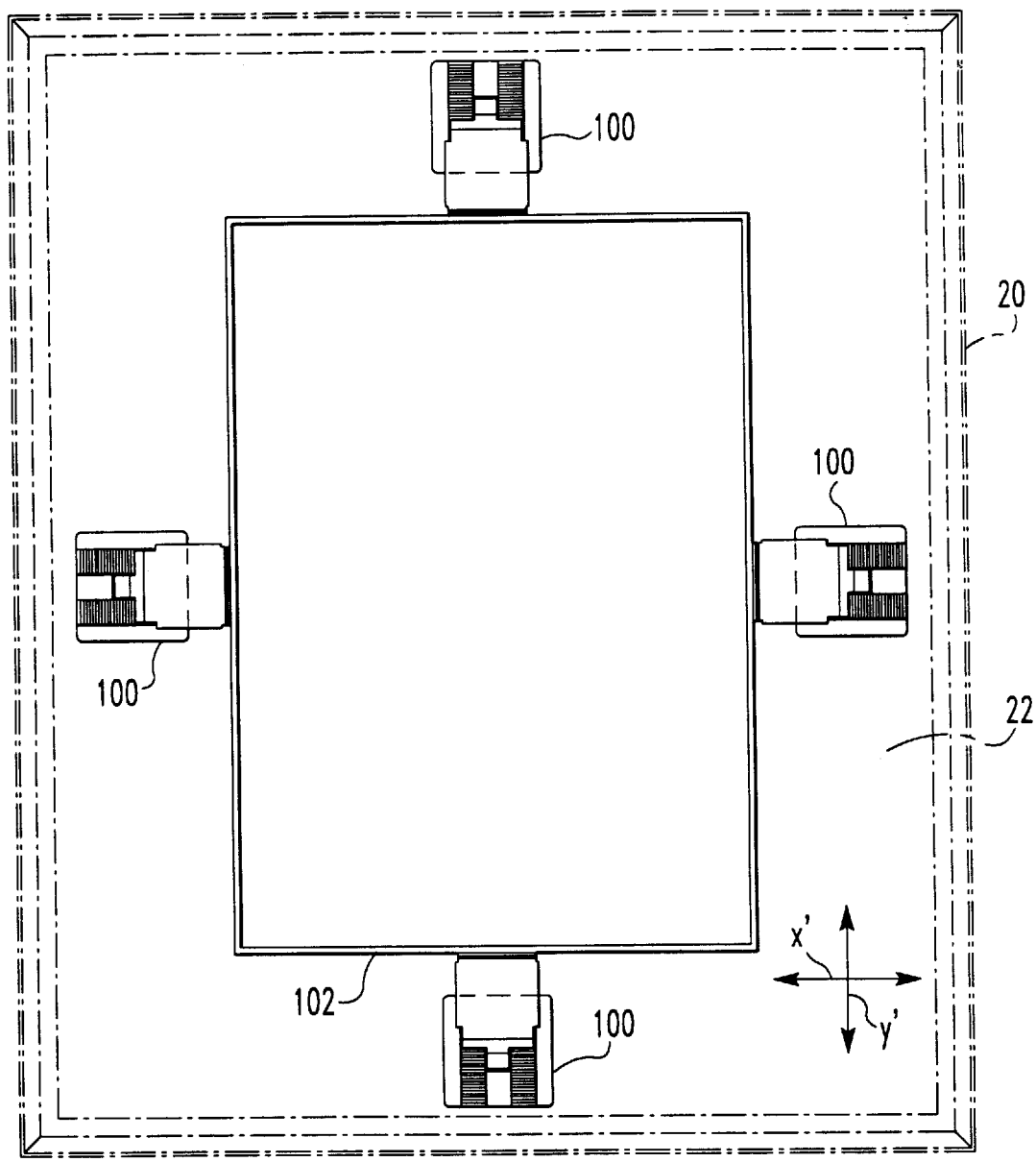
FIG. 17 is a top plan view of a box secured to the previously-described mat by movable side members in accordance with the present invention.

In some instances, a locking member 60 cannot be secured to a box 18 or other object, or the owner does not want to secure it to the box 18 or other object. In that case, an adjustable or movable side member 100 can be provided on the locking member 60, as shown in FIGS. 17–20. Specifically, FIG. 17 shows a box 102, such as a tool box, resting on an upper surface of the first layer 22 of the mat 20. Four movable side members 100 abut against sides of the box 102 holding it in place. The movable side members 100 are removably secured to the mat 20.

Figure 18:
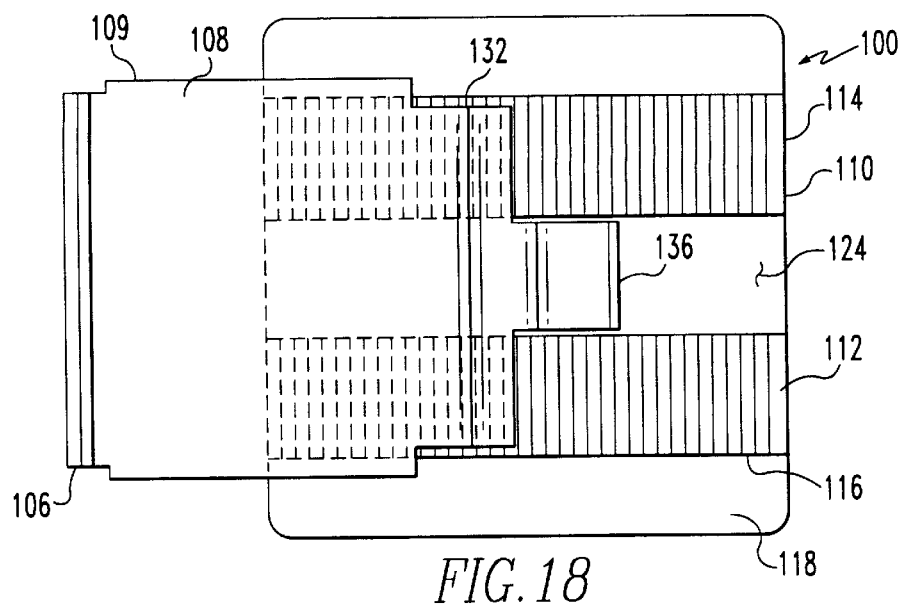
FIG. 18 is a top plan view of one of the movable side members.
Figure 19:
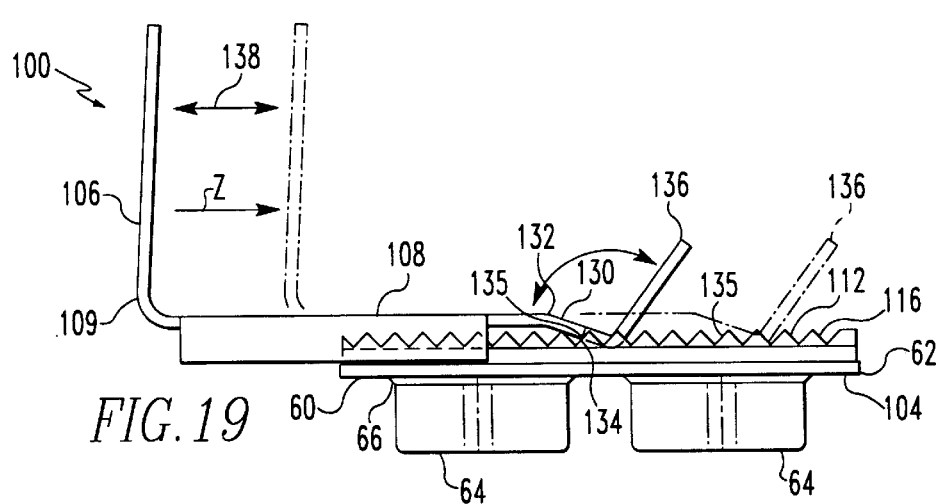
FIG. 19 is a side elevational view of the movable side member.
Figure 20:
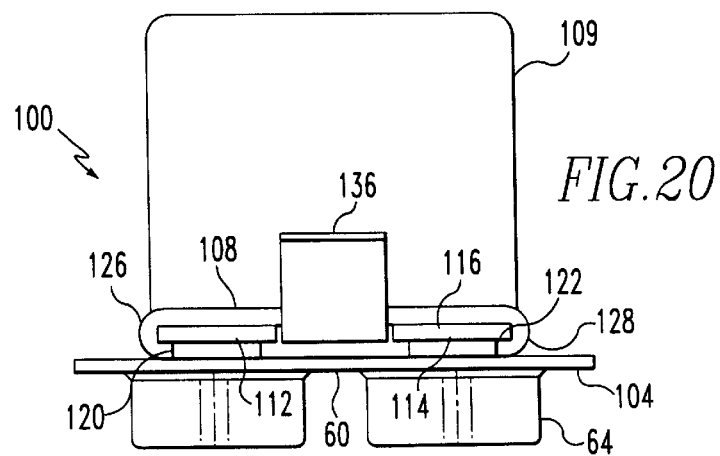
FIG. 20 is another side elevational view of the movable side member shown in FIG. 18.

Referring to FIGS. 18–20, each movable side member 100 includes a locking member 60 as previously discussed that includes a body 62, engagement members 64 and steps 66. The engagement members 64 and the steps 66 extend from a first surface 104 of the locking member 60. The movable side member 100 includes a first leg 106 connected to a depending second leg 108 forming a movable L-shaped member 109. The L-shaped member 109 is slidably received by track 110 which is attached to the body 62.

The track 110 is defined by a pair of spaced-apart toothed sections 112 and 114, each defined by a plurality of spaced teeth 116. Sections 112 and 114 are integrally secured to a second surface 118 of the locking member 60, which is opposite from first surface 104. Recessed areas 120 and 122 are defined between the toothed sections 112 and 114 and the second surface 118. A tab-receiving area 124 is defined between toothed sections 112 and 114 and second surface 118.

Leg 108 has lips 126 and 128 extending from opposite side edges. The ends of lips 126 and 128 are received within recessed areas 120 and 122. An angled portion 130 extends from a rear edge 132 of leg 108. An end 134 of the angled portion 130 is adapted to abut against forward surfaces 135 of the teeth 116. A tab 136 is attached to and extends from the angled portion 130.

In operation, the L-shaped member 109 is adapted to move along an axis 138. The L-shaped member 109 rides in the track 110 when the tab 136 is flexed or lifted by an operator to a disengaged position and moved along the axis 138 when the end 134 of the angled portion 130 does not contact the teeth 116. The end 134 is biased against the teeth 116 when it is not lifted by the operator.

The lips 126 and 128 positioned in recessed areas 120 and 122 prevent the L-shaped member 109 from disengaging from the track 110. Release of the tab 136 causes the end 134 of the angled portion 130 to contact respective teeth 116 of the toothed sections 112 and 114 and prevents or locks the L-shaped member 109 from moving in the Z direction in a manner similar to a pawl and ratchet assembly.

Typically, four movable side members 100 are needed to secure the box 102 to the mat 20 in the X' and Y' directions, as shown in FIG. 17. The box 102 can be removed by the operator lifting it upward from the mat 20 or by removing the movable side members 100. In some instances, the L-shaped member 109 must be slightly "loosened" or adjusted in the Z direction to permit the box 102 to be removed by the operator. The movable side member 100 can be made of any material, but preferably is made of polyethylene.

FIGS. 21–26 show a hanging device 200 that is used in conjunction with the mat 20. The hanging device 200 includes a cross member 202 pivotally secured to leg structures or members 204 and 206 by pins 208 and 210, thereby forming a support member. Each leg structure 204 and 206 includes a first leg 212, which is pivotally secured by a respective pin 208 or 210 to cross member 202. A second leg 214 is pivotally secured to leg 212 by pin 216. Pads 218 are pivotally secured to the lower ends of legs 212 and 214 by pins 220. Locking members 60 are secured to the pads 218, which each include a body 62, engagement members 64 extending from the body 62 and step 66. Specifically, the bodies 62 are secured to the pads 218. Each of the engagement members 64 are adapted to removably engage with one or more of the protrusions 30 of the mat 20.

Two sets of hangers 222 are pivotally secured to the cross member 202. Each set of hangers 222 includes two hangers 224, each of which includes a first straight section 226 and a hooked end 228. An end 230, opposite hooked end 228, is pivotally secured to the cross member 202 by a pin 232. A linkage 234 pivotally joins the two adjacent hangers 224 of each set of hangers 222. In this manner, the hangers 224 that make up each set of hangers 222 move together.

Figure 21:
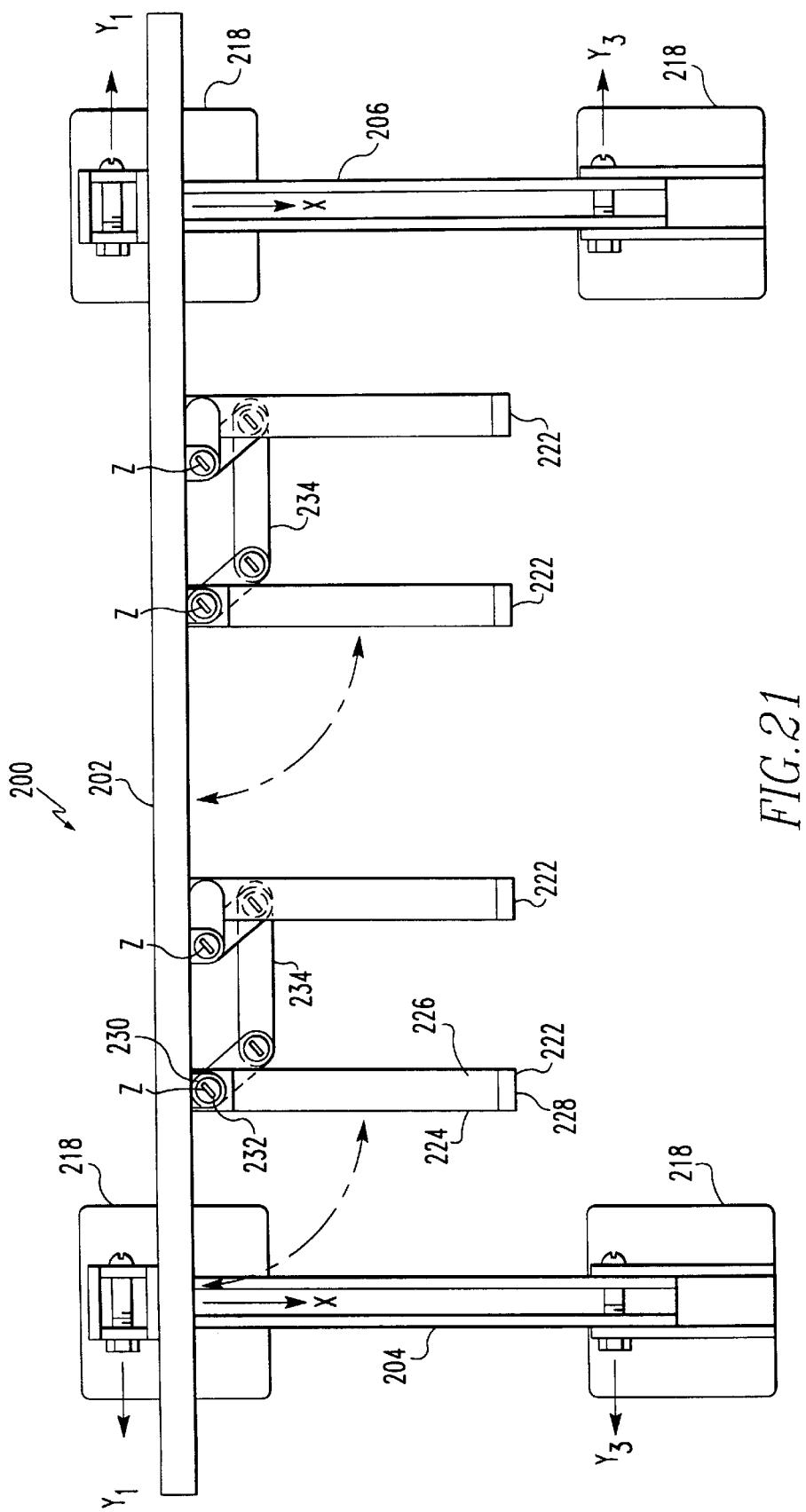
FIG. 21 is a top plan view of a hanging device in accordance with the present invention.
Figure 22:
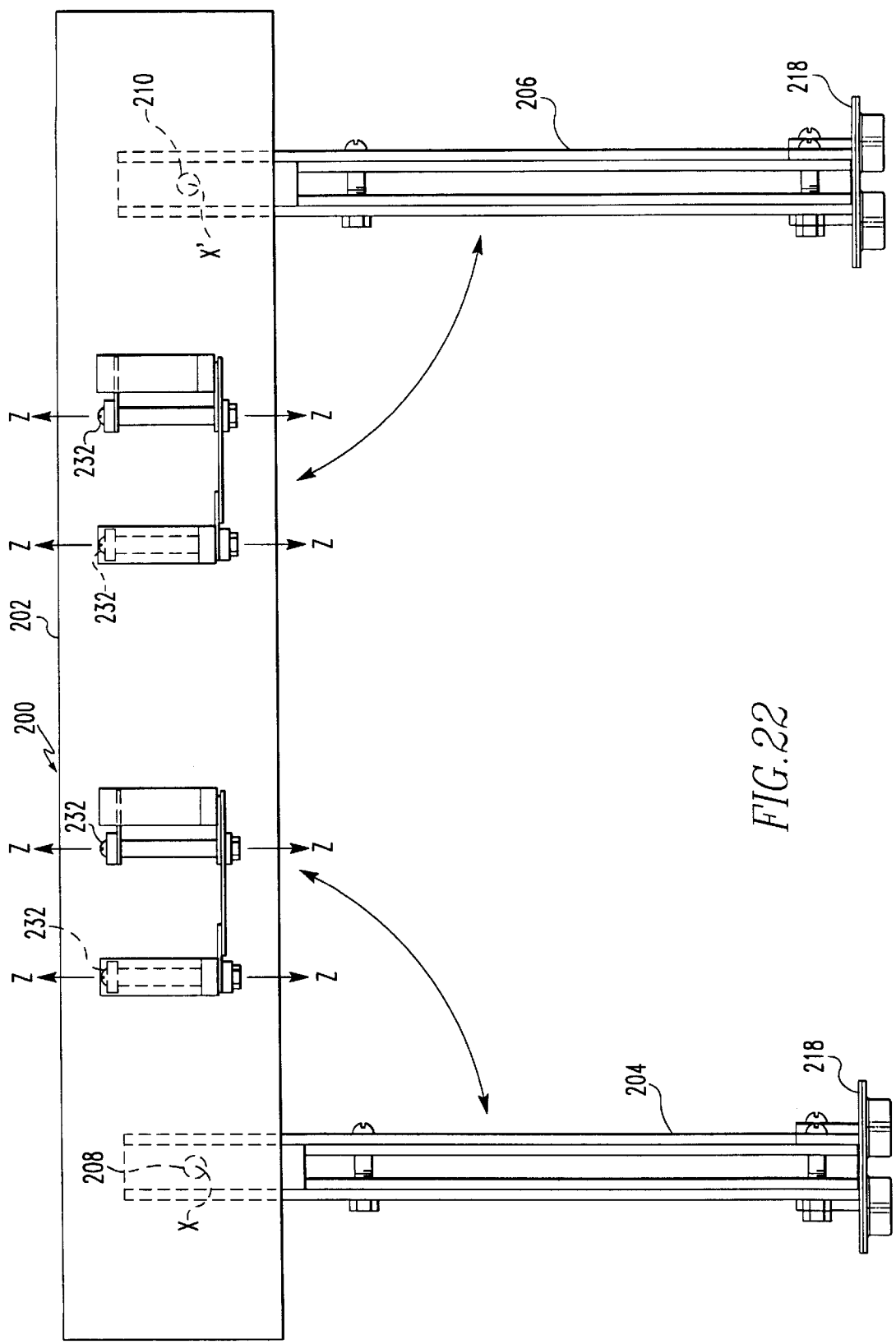
FIG. 22 is a side elevational view of the hanging device shown in FIG. 21.
Figure 23:
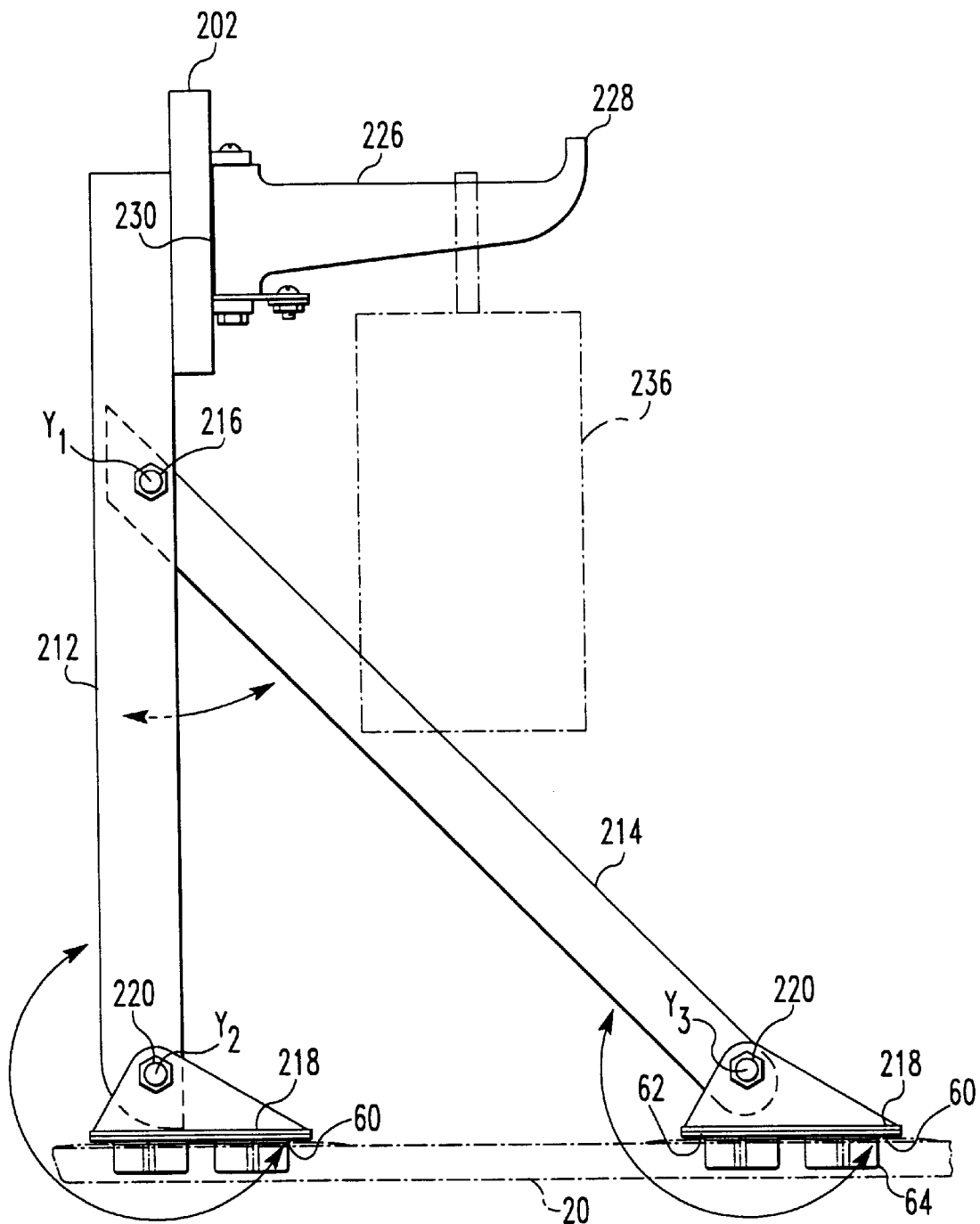
FIG. 23 is another side elevational view of the hanging device shown in FIG. 21.
Figure 27:
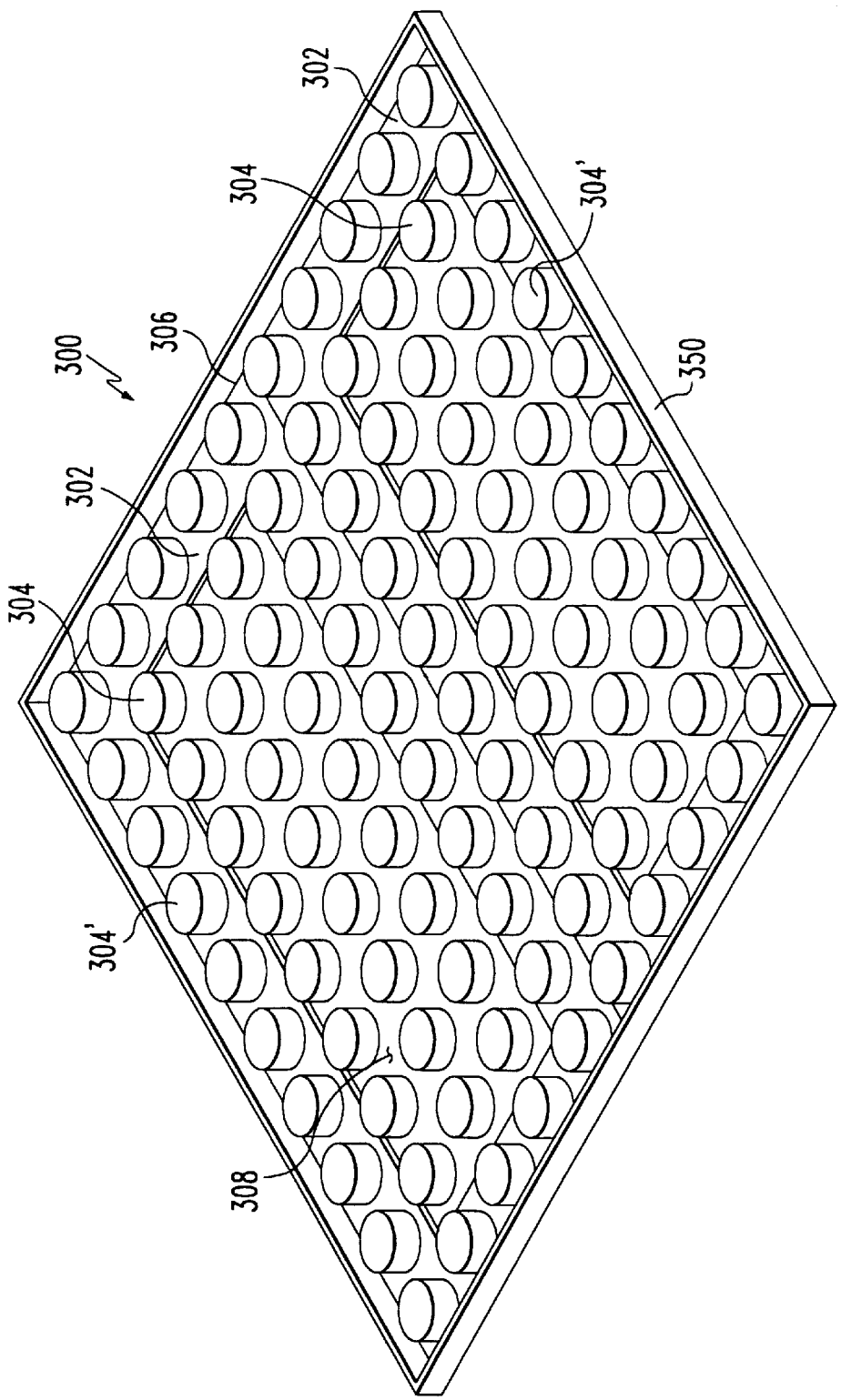
FIG. 27 is a top perspective view of another embodiment of a cargo holder system in accordance with the present invention.
Figure 28:
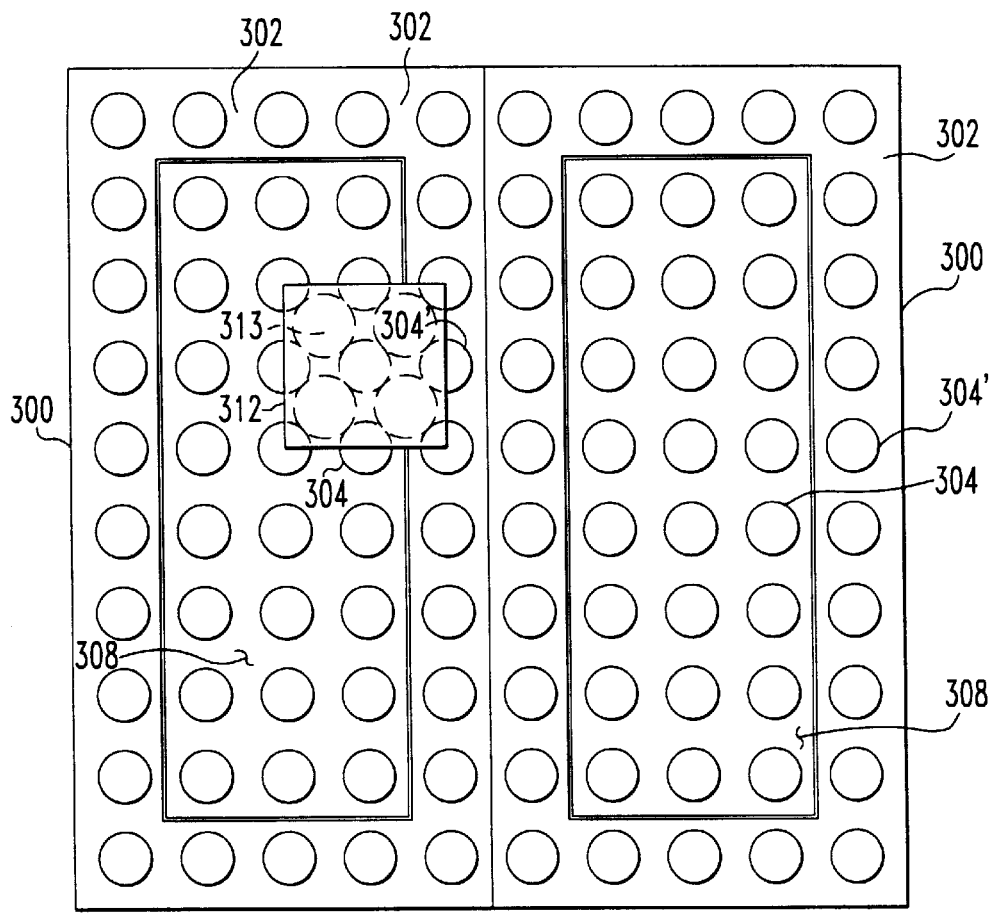
FIG. 28 is a top plan view of a mat used in the cargo holder system shown in FIG. 27.
Figure 29:
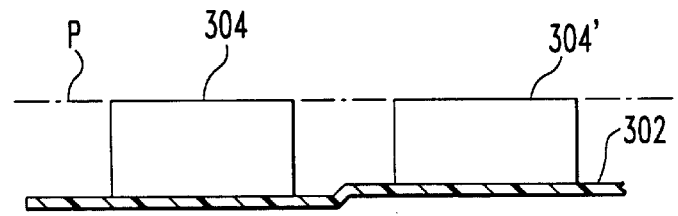
FIG. 29 is a side elevational view, partially in section, of a portion of the mat shown in FIG. 28.
Figure 30:
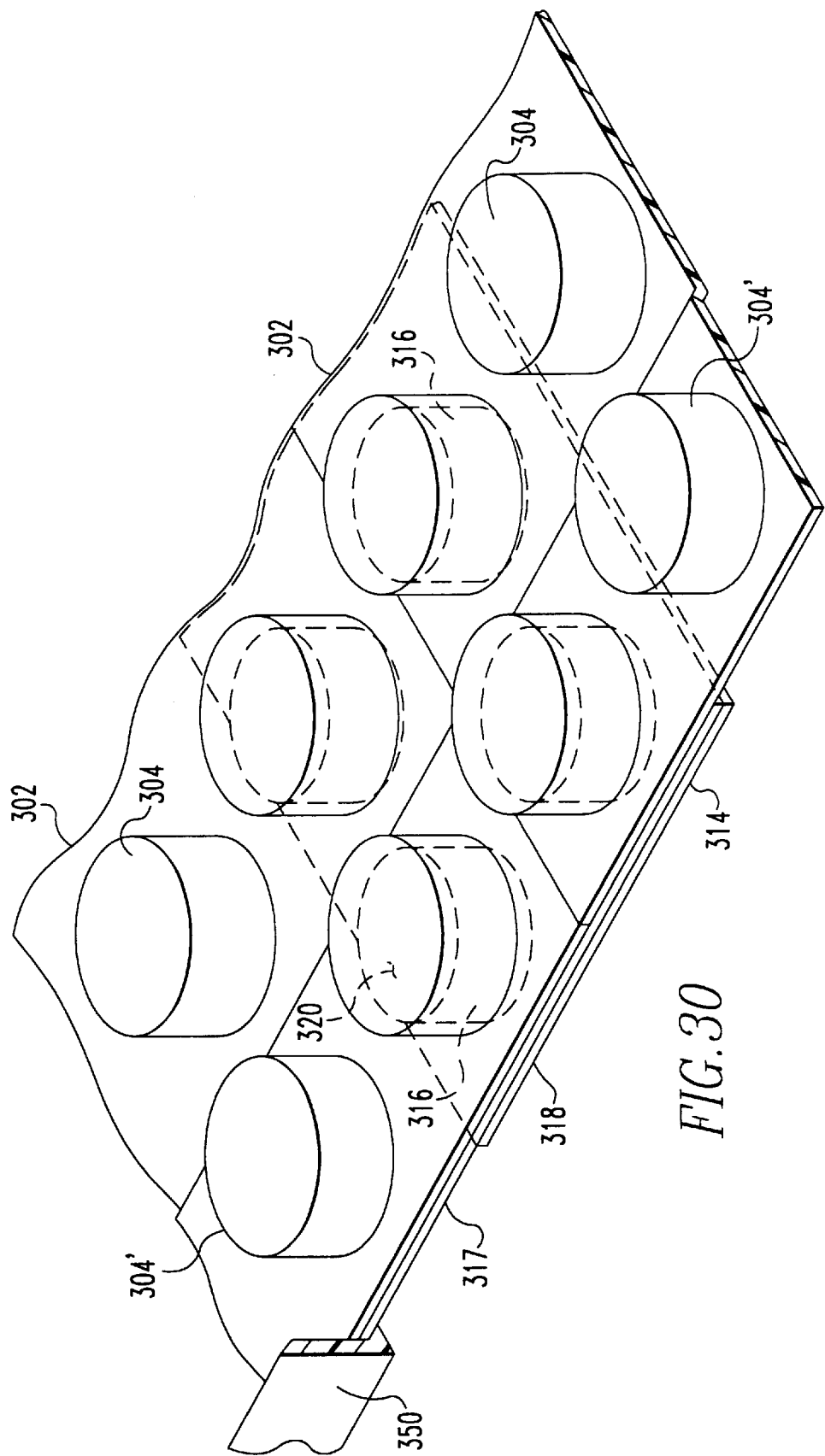
FIG. 30 is a top perspective view, partially in section, of a portion of the cargo holder system shown in FIG. 27.

FIGS. 21–23 show the hanging device 200 in a hanging position, which can be removably secured to the mat 20 by engaging the four locking members 60 into the respective receiving recesses 48 as previously described. Bags 236 or other handled members can be hung on hanger 224, as shown in phantom in FIG. 23. In this manner, the contents of the bags will not spill into the vehicle cargo section 14 while the vehicle is moving.

As shown in FIGS. 24–26, the hanging device 200 can be easily stored in a storing position or collapsed state when not needed. First, the hanging device 200 is disengaged from mat 20. The sets of hangers 222 are then pivoted about Z axes, which extend through pin 232 so that the hangers 224 move from an extended position, as shown in FIG. 21, to a retracted position, as shown in FIGS. 25 and 26. Referring to FIG. 23, pads 218 are then rotated in the clockwise direction about axes $Y_2$ and $Y_3$ and first legs 214 are rotated in the clockwise direction about the axis $Y_1$. Then, referring to FIG. 22, leg structure 204 is rotated in a counterclockwise direction about axis X and leg structure 206 is rotated in a clockwise direction about axis X'. This results in a compact structure 238, as shown in FIGS. 24–26, which can be stored under a sport utility vehicle seat or in the rear cargo section 14. The above procedure is reversed when the hanging device 200 is needed in the hanging position. The hanging device 200 can be made of any material. Hence, the mat 20 can be used to secure a variety of holding devices, such as boxes 18 or a hanging device 200.

FIGS. 27–30 show another embodiment of a mat 300 in accordance with the present invention, wherein the mat 300 includes a base 302 having a plurality of spaced cylindrically-shaped protrusions 304 extending therefrom. A plurality of protrusions 304' adjacent the perimeter 306 of the mat 300 is positioned on a stepped or raised portion of the base 302. Upper surfaces of all of the protrusions are contained in the same plane P, which results in the depth of the protrusions 304 being greater than the depth of the protrusions 304'. Receiving recesses 308 are defined by adjacent protrusions 304 and 304'.

Figure 31:
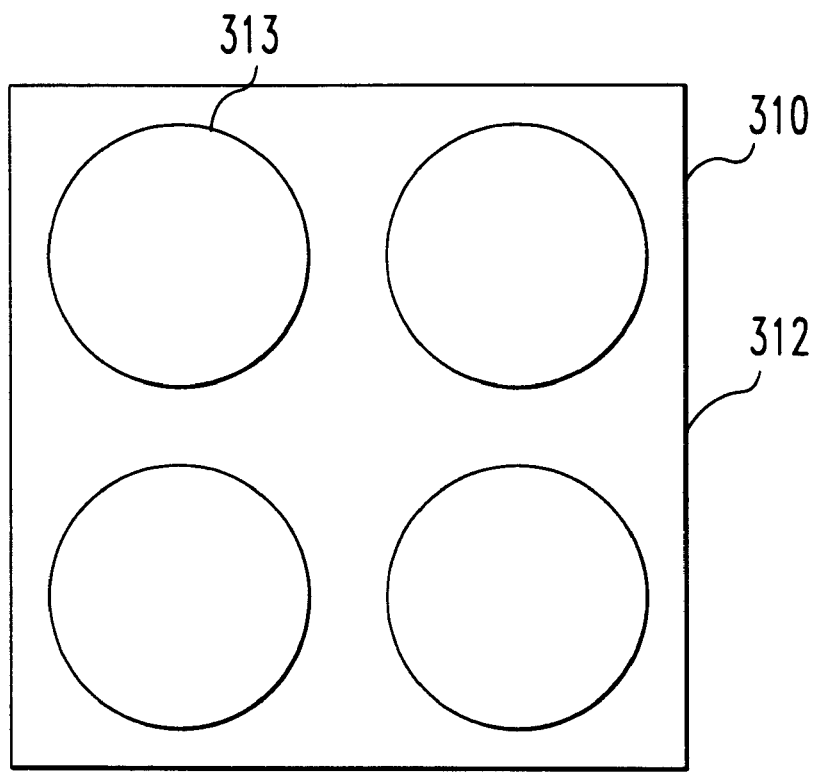
FIG. 31 is a top plan view of a locking member in accordance with the present invention and adapted to engage with the mat shown in FIGS. 27–30.
Figure 32:
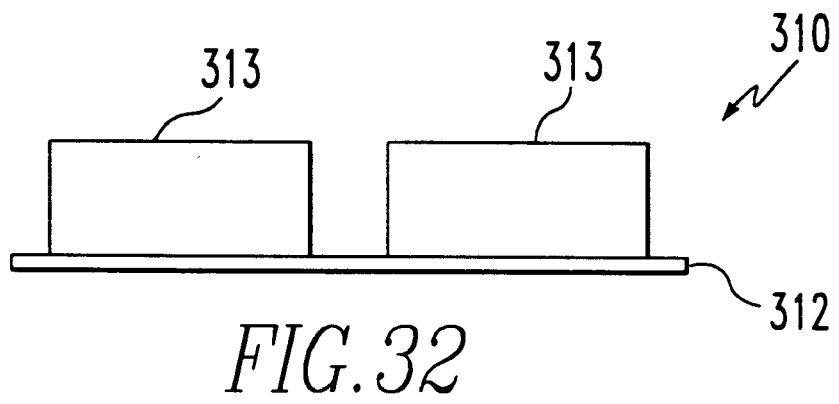
FIG. 32 is a side elevational view of the locking member shown in FIG. 31.

Referring to FIGS. 31 and 32, locking members 310 are provided having a body 312 and cylindrically-shaped engagement members 313 adapted to be received in receiving recesses 308 (as shown in phantom in FIG. 28) in a similar manner as engagement members 64 are received by receiving recesses 48. Locking members 310 can be used in lieu of locking members 60 on boxes 18.

Referring again to FIGS. 27 and 30, two or more mats 300 can be connected to each other by a strip 314 having a plurality of securing members 316 extending from a body 318. The securing members are received in a recess 320 defined by an underside of the mat where the protrusions extend. The strip 314 extends along adjacent stepped portions of the base. A sealant 317, such as a silicone based sealant, i.e., RTV, can be used to prevent leakage between the strip 314 and the two adjacent mats 300. A separate edge fence portion 350 can also be provided to extend around the perimeter of the mat 300. The edge fence portion 350 is secured to the underside of the protrusions in a similar manner as the strip 314 is secured to the mat 300; alternatively, the edge fence portion 350 can be adhered to the mats using a sealant, an adhesive or screws. The edge fence portion 350 acts like the lip 42 to contain liquid on the mat.

Provided that the spacing and the size of engagement members 313 are sufficient, locking members 310 can be used to secure boxes 18 to mats 20. Likewise, locking members 60 can be used to secure boxes 18 to mat 20.

Figure 33:
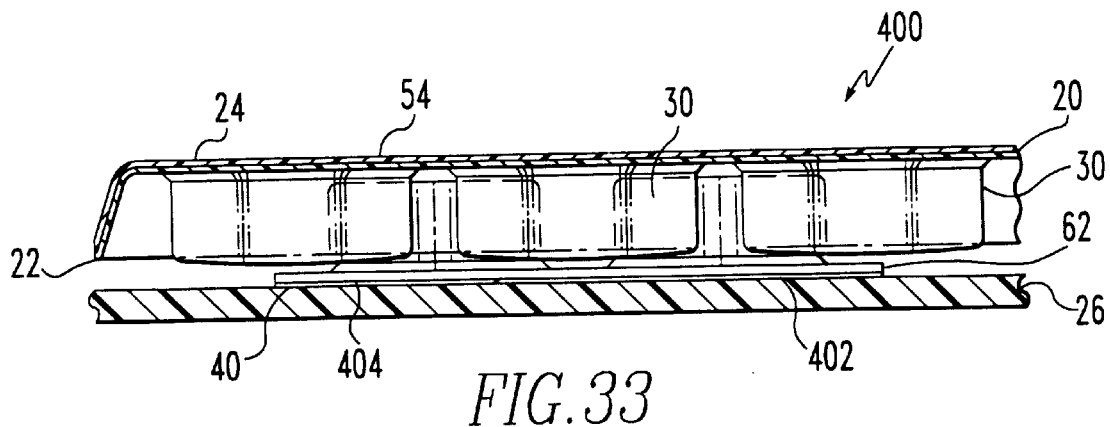
FIG. 33 is a side elevational view, partially in section, of a portion of a cargo liner in accordance with the present invention.
Figure 34:
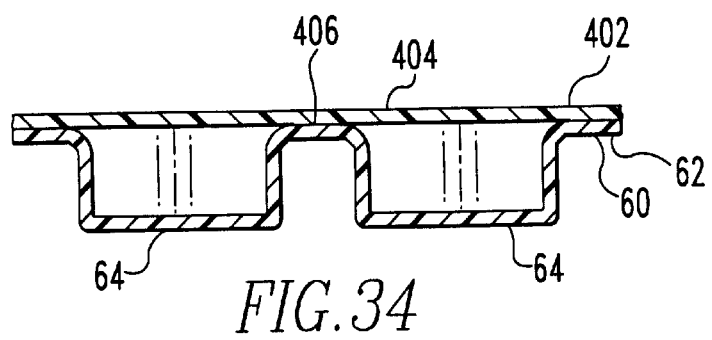
FIG. 34 is a sectional side elevational view of a locking member shown in FIG. 33.

FIGS. 33 and 34 show another embodiment of the present invention which is similar to the arrangement shown in FIGS. 4–13, with like reference numerals for like elements. Referring to FIG. 33, a cargo liner system 400 is shown resting on a carpeted section 26 of a sport utility vehicle 10. The cargo liner system 400 includes the previously described rectangular-shaped mat 20 and first layer 22 and second layer 24. First layer 22 is preferably made from polyethylene and defines a plurality of protrusions 30. Second layer 24 is preferably made of rubber. In some instances, the operation of the vehicle does not need to lock a box to the mat 20 as previously described, but does need to place something, such as a dog, on the rubber flat surface 54 which has a high coefficient of friction. However, placing the protrusions 30 on the carpet will enable the mat 20 to easily slide on the carpeted section 26. To offset this sliding effect, four locking members 402 (of which only one is shown) are provided. Each locking member 402 includes a locking member 60 having a body 62 and engagement members 64, as shown in FIGS. 8–10. A rubber layer or high friction layer 404 is secured to an interface surface 406 of the locking member 60 either by bonding, adhesive or fasteners. Preferably, the locking members 60 are made of polyethylene and the rubber layer 404 is made of the previously described olefin-friendly rubber and bonded to the interface surface 406 by the previously described method. Preferably, the four locking members 60 are removably engaged to the mat 20 at respective corners. The engagement members 64 coact with the protrusions 30 in the same manner as previously described so that the locking members 402 are removably secured to the mat 20. The mat is arranged so that the rubber layers 404 of the locking members 402 rest directly on the carpeted section 26. In this arrangement, flat surface 54 is exposed to support an object. The high coefficient of friction rubber layer 404 prevents the mat 20 from sliding across the carpeted section 26 and the flat portion 54 provides a flat surface to support an object or permit a pet, such as a dog, to walk thereon without the protrusions hurting its feet. In lieu of rubber layer 404 and the rubber second layer 24, modified surfaces can be provided, such as by roughening the polyethylene surfaces to increase the coefficient of friction of those surfaces.

Having described the presently preferred embodiments of the invention, it is to be understood that they may be otherwise embodied within the scope of the appended claims.

I claim:

1. A mat for engaging a locking member having a body and an engagement member extending therefrom, comprising:
    a base having a perimeter with a lip extending from said base about the perimeter of said base; and
    a plurality of protrusions extending from said base, said protrusions defining an engagement-receiving recess adapted to receive the engagement member of the locking member, wherein each of said protrusions includes an upper surface connected to a side surface having a geometric shape in the form of a polygon.

2. A mat as claimed in claim 1, wherein said protrusions are contained within a plurality of rows and columns.

3. A mat as claimed in claim 1, wherein all of said protrusions are symmetrical.

4. A mat as claimed in claim 1, wherein said protrusions are spaced apart from each other.

5. A mat as claimed in claim 1, wherein the polygon is an octagon.

6. A mat as claimed in claim 1, wherein four of said protrusions define the engagement-receiving recess.

7. A mat as claimed in claim 6, wherein the engagement-receiving recess is adapted to receive a rectangular-shaped engagement member.

8. A mat as claimed in claim 1, wherein each of said protrusions includes a nub extending from a respective protrusion and is adapted to coact with the engagement member.

9. A mat as claimed in claim 1, wherein each of said protrusions includes a nub extending into a respective one of the engagement-receiving recesses.

10. A mat as claimed in claim 1, wherein said base includes a first layer and a second layer, said protrusion is made of the same material as said first layer and has a first coefficient of friction and said second layer of said base has a second coefficient of friction.

11. A mat as claimed in claim 10, wherein said first layer includes said protrusions and said first layer comprises polyethylene.

12. A mat as claimed in claim 11, wherein said second layer comprises rubber and said second layer is bonded to said first layer.

13. A locking member for engaging to a mat having a body and a plurality of spaced-apart protrusions extending therefrom, wherein adjacent protrusions define a plurality of spaced-apart engagement-receiving recesses, each recess being adapted to receive an engagement member, said locking member comprising:
    a body that forms a portion of a receptacle; and
    a plurality of engagement members extending therefrom, said engagement members adapted to be received by the engagement-receiving recesses, each of said engagement members comprising a nub adapted to coact with a respective protrusion of the mat.

14. A locking member as claimed in claim 13, wherein said engagement members are geometrically shaped.

15. A locking member as claimed in claim 14, wherein said engagement members are polygonally shaped.

16. A locking member as claimed in claim 15, wherein said engagement members are rectangularly shaped.

17. A locking member as claimed in claim 13, further comprising a movable member attached to said body on a surface opposite from a surface upon which said engagement member extends.

18. A locking member as claimed in claim 13, further comprising:
    a support member secured to said body; and
    a hanger secured to said support member.

19. In combination: a mat and a locking member, said mat comprising:
    a base having a perimeter with a lip extending from said base about the perimeter of said base; and
    a protrusion extending from said base, said protrusion having a nub; and
    said locking member comprising:
        a body and an engagement member having a nub extending therefrom, wherein said protrusion of said mat removably engages said engagement member of said locking member.

20. The combination as claimed in claim 19, said mat further comprising a plurality of spaced-apart protrusions which are contained within a plurality of rows and columns; and
    said locking member further comprising a plurality of spaced-apart engagement members extending from said body, wherein each of said engagement members is adapted to engage respective ones of said protrusions.

21. The combination as claimed in claim 20, wherein adjacent ones of said protrusions define a plurality of spaced-apart engagement-receiving recesses, each of said receiving recesses adapted to receive one of said engagement members of said locking member,
    said mat further comprising:
    a lip extending from said base about a perimeter of said base.

22. A mat for engaging a locking member having a body and an engagement member extending therefrom, comprising:
    a base having a perimeter with a lip extending from said base about the perimeter of said base; and
    a plurality of protrusions extending from said base, said protrusions adapted to engage the engagement member of the locking member, each of said protrusions including a nub extending therefrom, wherein said nub is adapted to coact with the engagement member.

23. A mat for engaging a locking member having a body and an engagement member extending therefrom, comprising:
    a base having a perimeter with a lip extending from said base about the perimeter of said base; and
    a plurality of protrusions extending from said base, said protrusions defining one or more engagement-receiving recesses, each of said protrusions including a nub extending into a respective one of the engagement-receiving recesses, wherein adjacent protrusions define an engagement-receiving recess adapted to receive the engagement member of the locking member.

24. A mat for engaging a locking member having a body and an engagement member extending therefrom, comprising:

a base; and at least one protrusion extending from said base, said at least one protrusion adapted to engage the engagement member of the locking member, wherein said base includes a first layer comprising polyethylene and a second layer, said first layer includes said at least one protrusion and has a first coefficient of friction and said second layer of said base has a second coefficient of friction.

25. A mat as claimed in claim 24, wherein said second layer comprises rubber and said second layer is bonded to said first layer.

26. A locking member for engaging to a mat having a body and a protrusion extending therefrom, said locking member comprising:

a body; and an engagement member extending therefrom, said engagement member adapted to engage with the protrusion of the mat, wherein said body forms a portion of a receptacle.

27. A locking member for engaging to a mat having a body and a protrusion extending therefrom, said locking member comprising:

a body;

an engagement member extending therefrom, said engagement member adapted to engage with the protrusion of the mat; and a movable member attached to said body on a surface opposite from a surface upon which said engagement member extends.

28. A locking member as claimed in claim 27, wherein said movable member is L-shaped.

29. A locking member as claimed in claim 28, wherein said locking member body includes a first surface and a second surface, wherein said engagement member extends from said first surface and a plurality of spaced teeth extend from said second surface, said movable member having a first leg connected to a second leg, said second leg including a tooth-engaging member adapted to engage with said plurality of teeth for locking said side member in place.

30. A locking member as claimed in claim 29, further comprising:

a tab attached to said tooth-engaging member, wherein said tooth-engaging member can be flexed from an engaged position to a disengaged position by movement of said tab, said second leg further defining a lip for coacting with a track attached to said second side of said base, whereby said movable member can be slid along said track when said tooth-engaging member is in an unengaged position.

31. A locking member as claimed in claim 27, further comprising a nub adapted to coact with a respective protrusion of the mat.

32. A locking member for engaging to a mat having a body and a protrusion extending therefrom, said locking member comprising:

a body;

an engagement member extending therefrom, said engagement member adapted to engage with the protrusion of the mat;

a support member secured to said body; and a hanger secured to said support member.

33. A locking member as claimed in claim 32, wherein said support member includes two spaced-apart legs secured to said body and a cross member secured to said legs, said hanger being secured to said cross member.

34. A locking member as claimed in claim 33, wherein each of said legs is pivotally secured to said cross member and said hanger is pivotally secured to said cross member.

35. A locking member for engaging to a mat having a body and a protrusion extending therefrom, said locking member comprising:

a body; and an engagement member extending therefrom, said engagement member adapted to engage with the protrusion of the mat, wherein said body includes a first layer and a second layer, said engagement member is made of the same material as said first layer and has a first coefficient of friction and said second layer of said body has a second coefficient of friction.

36. A locking member as claimed in claim 35, wherein said first layer comprises polyethylene and said second layer comprises rubber.

* * * * *